Nov. 2, 1971  F. L. FOSLIEN  3,616,737
MICROFICHE HANDLER WITH FREE FLOATING AND VERNIER-TYPE
MOVEMENT OF SUPPORT FRAME
Filed Dec. 23, 1968  3 Sheets-Sheet 1

INVENTOR.
FLOYD L. FOSLIEN
BY Kinney, Alexander,
Sell, Steldt & DeLaHunt
ATTORNEYS INVENTOR.
FLOYD L. FOSLIEN
BY Kinney, Alexander,
Sell, Steldt & DeLaHunt
ATTORNEYS United States Patent Office 3,616,737
Patented Nov. 2, 1971

3,616,737
MICROFICHE HANDLER WITH FREE FLOATING AND VERNIER-TYPE MOVEMENT OF SUPPORT FRAME
Floyd L. Foslien, East Oakdale, Minn., assignor to Minnesota Mining and Manufacturing Company, St. Paul, Minn.
Filed Dec. 23, 1968, Ser. No. 786,073
Int. Cl. G03b 21/11
U.S. Cl. 95—37                                5 Claims

ABSTRACT OF THE DISCLOSURE

A control mechanism for a microfiche handler affording selectively free-floating movement and a vernier-type movement of a frame supporting a microfiche relative to the optical system of a reader and/or printer. The control mechanism utilizes systems of interlocking gears, including rotatable driving gears on one frame, which gears are separated from their cooperating gears to achieve the free-floating movement and which are biased independently into driving engagement for vernier-type adjustment.

The invention herein described was made in the course of or under a contract with the Department of the Army.

This invention relates to an improvement in handling and precisely positioning a member in a plane perpendicular to a predetermined axis, and in one aspect relates to an improved microfiche handling system to afford the precise positioning of tiny microimages in a light projection axis for viewing the image on a screen or projecting light images to a sensitive print paper.

The apparatus of the present invention uniquely improves the control system for microfiche handling equipment. The control mechanism of the present invention affords the simultaneous release of gear members between three relatively movable frames affording free-floating movement of the frame relative to each other and the engagement of the gear members independently for relative vernier movement of the frame along two perpendicular axes. The control mechanism of the present invention is an improvemenft over other known similar apparatus in that the gear members providing the movement along the separate axes are simultaneously released but the pairs of gear members are independently mounted and independently biased into engagement such that misalignment of the gear members between one set of frames does not prevent alignment and engagement of the gear members between another pair of frames.

A copending application of Siegfried F. Rathfelder, Ser. No. 786,072 filed on even day herewith and assigned to the common assignee, discloses a novel apparatus affording the free-floating or venier-type movement of a microfiche frame relative to supporting frames and illustrates means for the positioning of gear members affording selective vernier-type movement or free-floating movement. This unique apparatus affords many advantages in the handling of a microfiche but the positioning of the control members and the mounting for the control members cause some difficulty in that movement of the microfiche along one axis made it very difficult to operate both control knobs for the vernier-type movement and any interference between gears connecting one set of frames would also prevent engagement of the gears between the other set of frames and movement of said other set of frames.

The present invention overcomes these problems and has the advantage in that both of the control members are so mounted on one of the relatively movable frames that they are at all times accessible to the operator with equal convenience.

The control mechanism of the present invention also affords a mounting structure for the cooperating gears permitting floating movement of the microfiche supporting frame along either or both of the two axes and engagement of the two sets of gears independently or simultaneously for vernier-type movement depending only upon whether each set is aligned at the time they are to be engaged.

The apparatus of the present invention comprises a support frame, which may be or may include the reader frame, a first movable frame supported on said support frame for reciprocal movement relative to said support frame along a first axis, a second movable frame, having means for supporting a microfiche, supported by said first frame for reciprocal movement therewith and for movement relative thereto along a second axis normal to said first axis. Fixed gear means are supported by said support frame and said second frame and rotatable relatively associated gear means are supported on said first farme engageable with said fixed gear means to impart vernier-type relative movement between said frames. The rotatable gear means on the first frame are movably mounted to permit separation from the fixed gear means and are independently biased into return engagement with the fixed gear means. The frames are formed to permit light to pass therethrough.

The above and further advantages resulting from the present invention will be more readily apparent after reading the following description which refers to the accompanying drawing wherein:

FIG. 7 is a longitudinal vertical sectional view taken along the lines 7—7 of FIG. 3.

Figure 1:
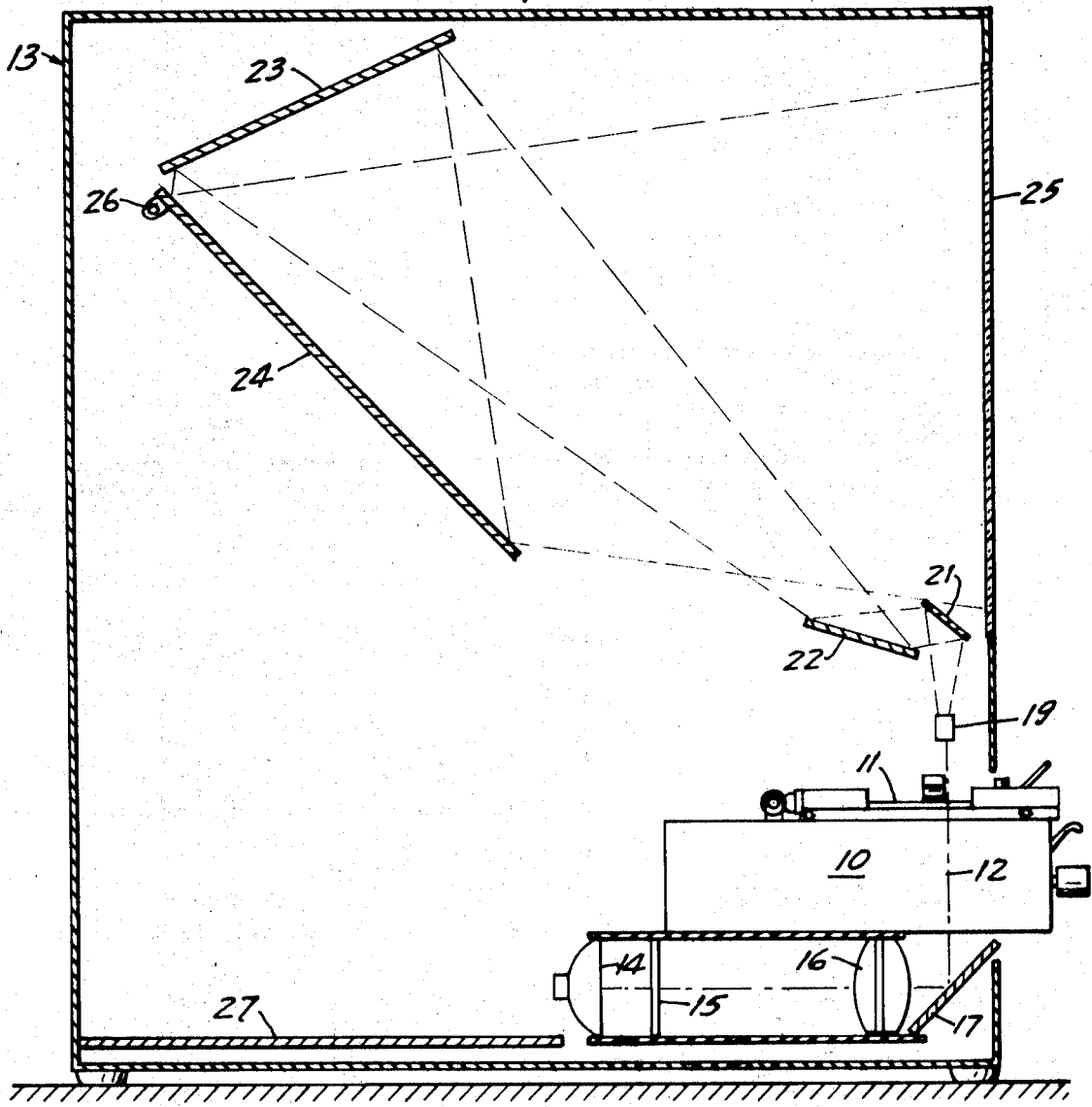
FIG. 1 is a schematic sectional view of a microfiche reader/printer embodying the present invention.
Figure 2:
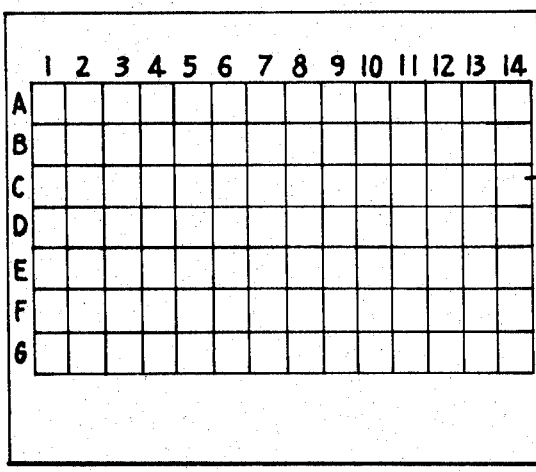
FIG. 2 is a view illustrating a microfiche card.
Figure 3:
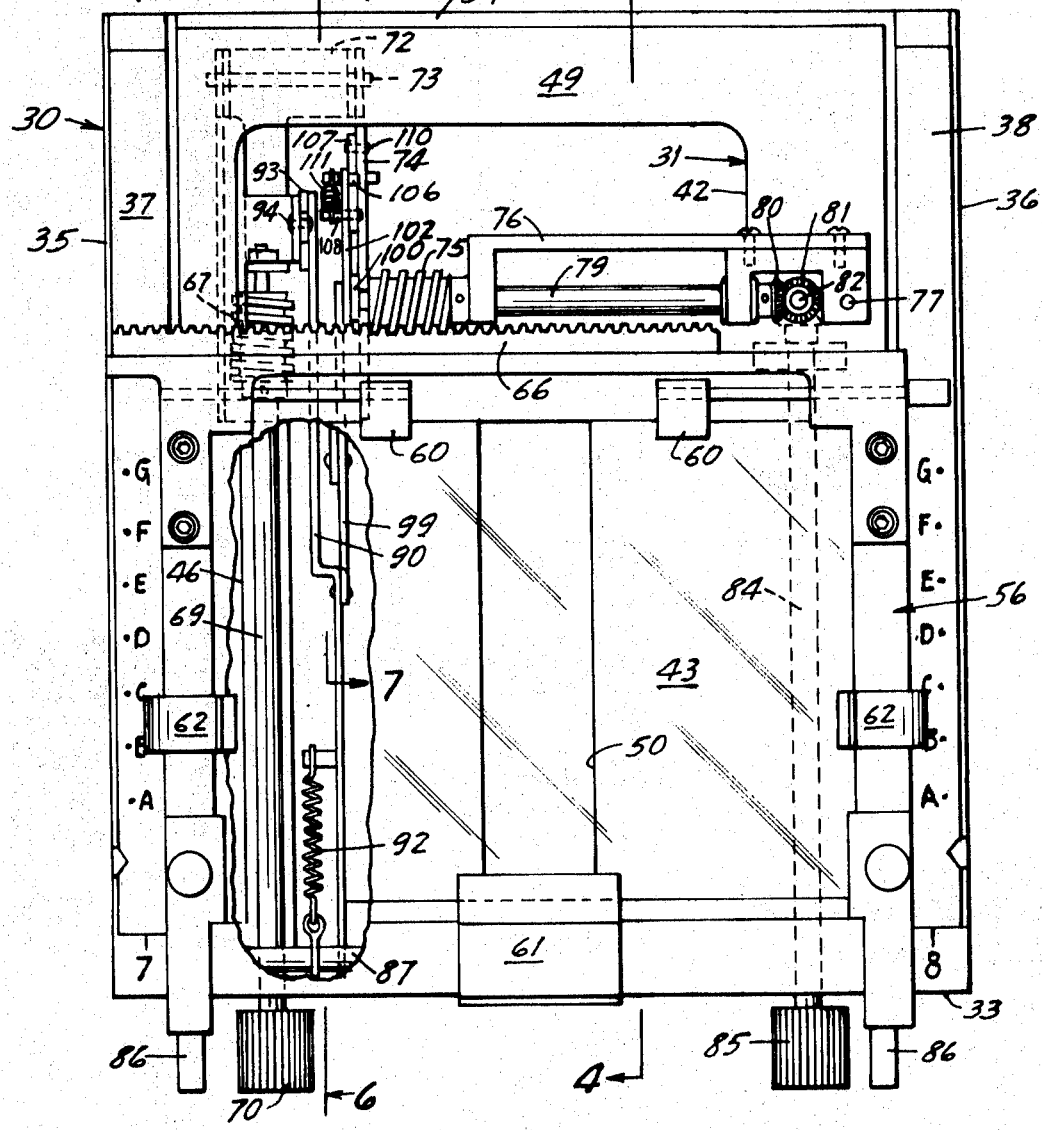
FIG. 3 is a plan view of the microfiche handler of the present invention.

Referring now to the drawing there is illustrated in FIG. 1 a microfiche handler 10 adapted for positioning rapidly and precisely a particular image on a microfiche 11 in a position to intersect the path of a projected light along its axis 12 in a reader and/or printer, generally designated 13. The reader/printer 13, would include a source of light, illustrated as lamp 14, a heat reflector 15, condensing lens 16, and a mirror 17 which directs the collected light along a path, the optic axis of the light being designated 12, through the microfiche handler 10 and the microfiche 11 to a projection lens within a barrel 19. From the projection lens the light image is reflected from a series of mirrors 21, 22, 23 and 24 to a rear projection screen 25, or, by pivoting the mirror 24 to a vertical position about the pivot 26, the projected image may fall upon a focal plane defined by a plate 27 upon which may be disposed a sensitized print paper.

Having thus described the general machine in which the handling mechanism of the present invention forms a part, attention is directed to the remaining figures which describe the handling mechanism 10 in more detail.

The mechanism 10 includes three basic relatively movable frame members. The multiple frames comprise a support frame 30, which may be or may include portions of the frame of the reader/printer 13, a first longitudinally movable frame 31, and a second movable frame 32 supported on the frame 31 and movable therewith and/or transversely thereto.

The support frame 30 is fixed relative to the projection light axis 12 and generally comprises a die cast rectangular box-like frame having a front wall 33, back wall 34, and transversely spaced side walls 35 and 36. Transversely spaced longitudinally extending guide members 37 and 38 are supported on the upper portions of the side walls 35 and 36 respectivey. These guide members are formed with longitudinally extending opposed V-shaped grooves forming races, each of which receive therein a rod 39 suitable for supporting the first movable frame 31 for longitudinal movement relative to said support frame 30. The support frame 30 also includes a longitudinally positioned support bar 40 supporting an elongated half nut 41 on its upper surface.

The first longitudinally movable frame 31 comprises a rectangular frame-like member 42 having a top plate 43, a depending front plate 44 which substantially covers an opening 45 in the front wall 33 of the frame 30, depending transversely spaced and longitudinally extending side walls 46 and 47, and a gear element supporting frame portion, generally designated 49, located beyond the plate 44. The outer face of the longitudinally extending edges of frame member 42 are formed with V-shaped grooves and support the rods 39. The rods are not axially movable relative to the frame 31 but slide along the guides 37 and 38. The rods 39 support the frame 31 from the frame 30 for smooth sliding movement and maintaining the top plate 43 in a fixed plane. The top plate 43 is provided with a longitudinally extending slotted opening 50 through which the projection light 12 may pass as the frame 31 is moved longitudinally on rods 39. A pair or fixed transversely extending spaced parallel guide members 51 and 52 are supported on the upper surface of the top plate 43. The opposed faces of the guide members 51 and 52 are formed with V-shaped grooves forming races for a set of rods 54 which support the second movable frame 32. Gear means for moving the frame 31 relative to frame 30 and frame 32 relative to frame 31 are supported, along with the controls therefore on the frame 31 as will hereinafter be described.

The second movable frame 32 comprises a small rectangular frame-like member 56 to which is hinged a pivotal transparent platen of cover member 57 which holds a microfiche 11 against the transparent glass plate 59 disposed in the opening within the frame 56. The cover member 57 can be just a rectangular glass plate to which is secured hinge members 60 and a handle 61, the latter affording the separation of the cover from the plate glass 59 in the frame against the bias of hold-down leaf springs 62 disposed at each side thereof. The transversely extending portions 64 and 65 of the frame are formed with V-shaped slots which receive the rods 54 in fixed position and permit the movement of the frame 32 and the rods 54 along the guides 51 and 52 on frame 31. An elongate half-nut member 66 is disposed on the longitudinal edge above the guides forming part of the gear means affording movement of the frame 32 relative to the frame 31.

The gear means associated with this microfiche handler include the half nut 41 and the half nut 66. These half-nut members are fixed to their respective frames and the movable worm gears cooperating therewith are supported by the frame 31. The first of these worm gears is the rotatable worm gear 67 fixed on a shaft 69 extending longitudinally of the frame 32 and having on its extended end a manually rotatable knob 70, which is positioned adjacent the forward face of the wall 44. The rear portion of the shaft 69 is journalled in a depending forward flange 71 of a pivoted support member 72 pivotally mounted on spaced legs to a pin 73 extending transversely between spaced walls of a mounting frame 74 (shown most clearly in FIG. 4) secured beneath the supporting portion 49 of frame 31. The shaft 69 and the bracket 71 thus form a toggle member with the worm gear positioned near the central joint. The worm gear 67 is normally biased into engagement with the half nut 41.

The second rotatable worm gear 75 is engageable with the half nut 66 and is supported on a pivotal frame 76. The pivotal frame 76 is mounted by a pin 77 to the gear element supporting frame portion 49 of frame 31. The worm gear 75 is mounted on a shaft 79 to which is fixed a beveled gear 80 engaging a beveled gear 81 on one end of a vertically journalled idler shaft 82 on the other end of which is supported a similar beveled gear for engagement with a beveled gear on the end of a longitudinally extending rotatable rod 84. The rod 84 carries at its opposite end, adjacent the wall 44, a manual control knob 85. Rotation of the knob 85 turns the rod 84 and through the beveled gears, drives the worm gear 75. The worm gear 75 is normally biased into engagement with the half nut 66 such that rotation of the knob 85 will drive the frame 32 back and forth transversely in a fixed plane across frame 31.

Figure 4:
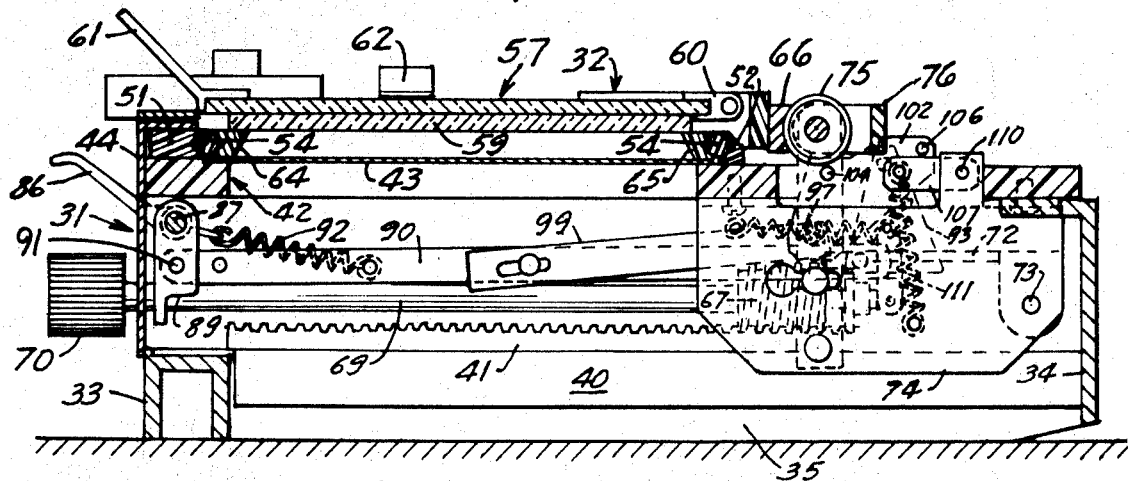
FIG. 4 is a longitudinal vertical sectional view of the microfiche handler taken along the line 4—4 of FIG. 3.
Figure 5:
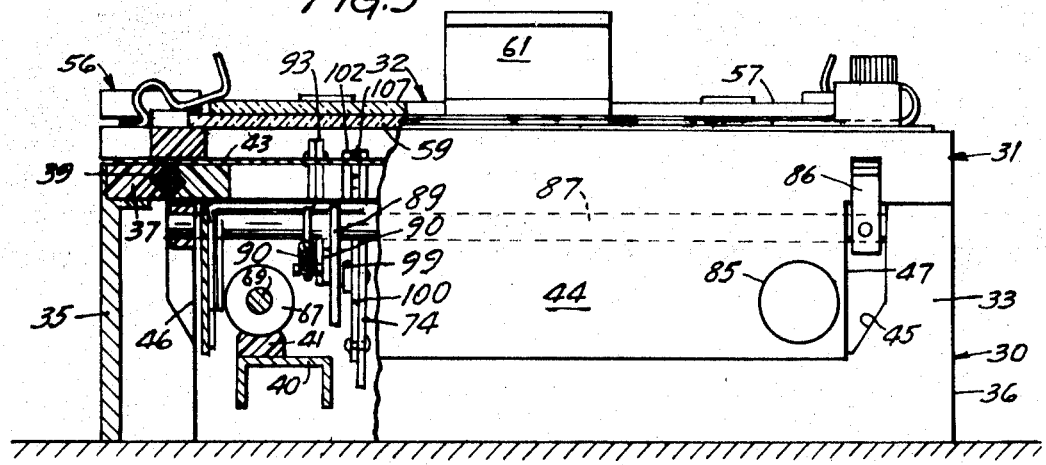
FIG. 5 is a front elevational view, partly broken away to show interior parts of the microfiche handler of FIG. 3.
Figure 6:
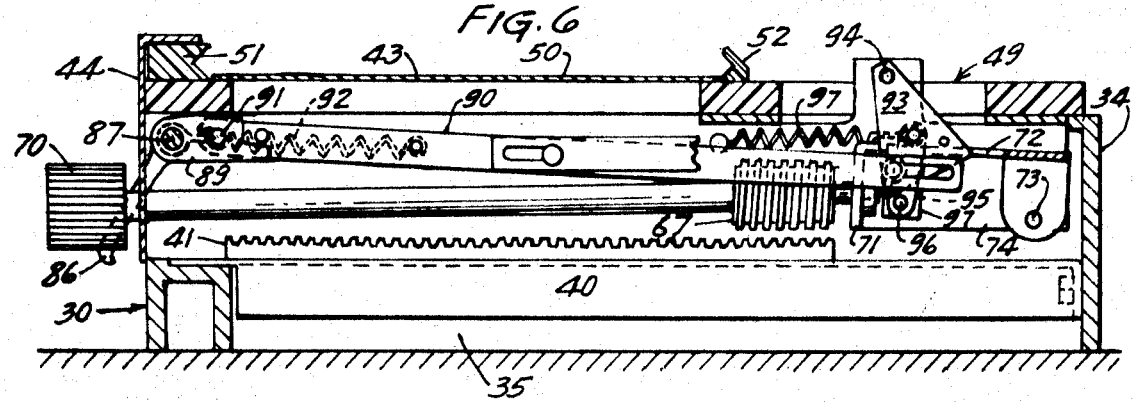
FIG. 6 is a longitudinal vertical sectional view taken along the lines 6—6 of FIG. 3.

It is possible to release or separate the worm gear 67 from engagement with the half nut 41 and the worm gear 75 from engagement with the half nut 66. This is accomplished by movement of one of a pair of levers 86 affording means for disabling the gear means to permit free floating movement of the frame 32 and frame 31 relative to each other and to the support frame 30. The disabling means includes a transversely extending shaft 87 which is journalled and extends through each side of the side walls 46 and 47 of frame 31 on the outer ends of which are mounted the radially extending levers 86 engageable by the operator to move them from a raised position permitting the worm gears to be engaged with the half nuts to a depending position separating the worm gears from the associated half nuts and disabling the means affording vernier-type movement of the frames. Positioned behind the plate 44 and secured to the transverse shaft 87 is a crank arm 89 movable upon rotation of the shaft 87 from a generally vertical position, as shown in FIG. 4, to a longitudinally extended position as illustrated in FIG. 6. The crank arm 89 is pivotally connected to one end of a first rearwardly extending link 90 forming a toggle therewith. Lowering of the levers 86 rotates the shaft 87 and moves the link 90 and a second link 99, having a lost-motion connection with the link 90, in a rearward direction. The links 90 and 99 are part of a disabling means for the vernier-type gear drives including gear 67 and the nut 41 and the gear 75 and the nut 66 to permit the floating movement of the frame.

The disabling means for the gear 67 is actuated upon movement of the lever 86 to the downward position, moving the pivot pin 91, connecting arm 89 and link 90, to an overcenter position where it is held under the bias of the tension spring 92. The opposite end of the link 90 is connected through a pin and slot lost-motion connection to a crank arm 93 pivoted relative to the frame 74 by a fixed pin 94. A link 95, connected to the arm 93 above the link 90, connects the arm 93 with a second depending flange 97 of the member 72 by a pin 96. In operation rearward movement of the link 90 causes the member 93 to pivot rearwardly about the pin 94, shortening the space between the pin 94 and the pin 96 by breaking the toggle formed by the arm 93 and the link 95 causing member 72 to pivot on pin 73 and raise the worm 67 out of engagement with the half nut 41. A tension spring 98 connected to the pin joining link 95, to the link 93 tends to straighten the toggle and maintains the worm 67 biased toward engagement with the half nut 41. The lost-motion connection between link 90 and the crank arm 93 permits the link 90 to move forward, but in the event the gear 67 cannot move to a fully seated position in the haf nut 41 it is not forced to this position by the return movement of link 90 but is biased under the force of the spring 97. The spring 97 is illustrated in FIGS. 4 and 6.

The disabling means for the gear 75 is operable simultaneously with the disabling means for the gear 67 and comprises the link 99, which is connected through a lost-motion pin and slot connection to the link 90; an extended pivot arm 100 (see FIG. 7) pivoted by a pin 101 to the frame 74 and journaling in its upper end the shaft 79 carrying the worm gear 75; a pivoted crank arm 102 pivotally connected to the arm 100 by a pin 104 and pivotally connected by a pin 105 to the link 99. The other leg of the crank arm 102 carries a fixed stop pin 106 and forms a toggle with a link 107 connected thereto by a pin 108. The link 107 in turn is pivoted by a pin 110 to a bracket on the frame 74. A spring 111 connected to the pin 108 tends to straighten the toggle between crank arm 102 and the link 107 to extend the distance between pins 104 and 110 and biasing the worm gear 75 into engagement with the half nut 66. Rearward movement of the link 99 breaks the toggle joint, decreasing this distance and pivoting arm 100 about pin 101, retracting gear 75 from the half nut 66. Release of the link 99, by movement of the levers 86 to the upward position, causes the worm gear 75 to be biased into engagement with the half nuts 66. In the event one of gears 67 or 75 does not align with the associated half nut, the lost-motion pin and slot connection between link 99 and link 90 or between link 90 and crank arm 93 permits their independent return movement.

Without the novel mounting arrangement with the two worm gears adjacent each other, near one corner of the frame 31, and supported for the independent return movement to an engaged position, the extent of the parts necessary to annoyance and inability to readily bring a desired image into the proper position with respect to the optical light path 12 is less practical.

Having thus described the present invention in connection with a preferred embodiment, what is claimed is:

1. A card handling and positioning apparatus for use with a projecting means comprising
   a support frame,
   a first movable frame,
   first guide members on said support frame and on said first frame for supporting said first frame for reciprocal movement relative to said support frame along a first axis,
   a second movable frame for supporting a card,
   second guide members on said first frame and on said second frame for supporting said second frame on said first frame for reciprocal movement relative to said first frame along a second axis normal to said first axis,
   fixed gear means on said support frame,
   fixed gear means on said second frame,
   rotatable gear means on said first frame engageable with said fixed gear means on said support frame and on said second frame affording relative movement between said frames,
   means on said first frame for operating said rotatable gear means, and
   means on said first frame for separating said rotatable gear means on said first frame from said fixed gear means on said support frame and on said second frame such that said second frame can be moved free of the resistance of said gear means along said first axis and said second axis.

2. A card handling and positioning apparatus as described in claim 1 wherein said rotatable gear means include worm gears rotatably and pivotally mounted on said first frame and said fixed gear means include elongated half nuts positioned parallel to the associated guide members and disposed for engagement by said worm gears affording movement of said first movable frame and said second movable frame upon rotation of said worm gears.

3. A card handling and positioning apparatus as described in claim 2 wherein manually operable lever means afford pivotal movement of said worm gears out of engagement with said half nut means simultaneously and wherein said lever means include a lost motion connection between members of said lever means connected to each of said worm gears for independent return of said worm gears to engagement with said half nuts.

4. A card handling and positioning apparatus as described in claim 3 wherein said lever means includes a toggle linkage having a collapsed position and an overcenter extended position, and spring means for maintaining said toggle linkage in said overcenter extended position to hold said worm gears in a disengaged position for free-floating movement of the frames.

5. A card handling and positioning apparatus as described in claim 2 wherein said worm gears and half nuts are moved relative to each other by mounting means for said worm gears, each mounting means comprising a toggle linkage for moving said worm gear and spring means for locking said toggle linkage in overcenter position to maintain said worm gear in engagement with said half nut upon movement into engagement.

References Cited
UNITED STATES PATENTS

| | | | |
|---|---|---|---|
| 1,244,362 | 10/1917 | Ogden | 355—86 |
| 1,431,664 | 10/1922 | Huebner | 355—86 |
| 2,459,552 | 1/1949 | Stoner et al. | 355—53 |
| 2,535,297 | 12/1950 | Larsson | 95—37 |

JOHN M. HORAN, Primary Examiner

T. A. MAURO, Assistant Examiner

U.S. Cl. X.R.

353—25; 355—53, 86